Figure 1:
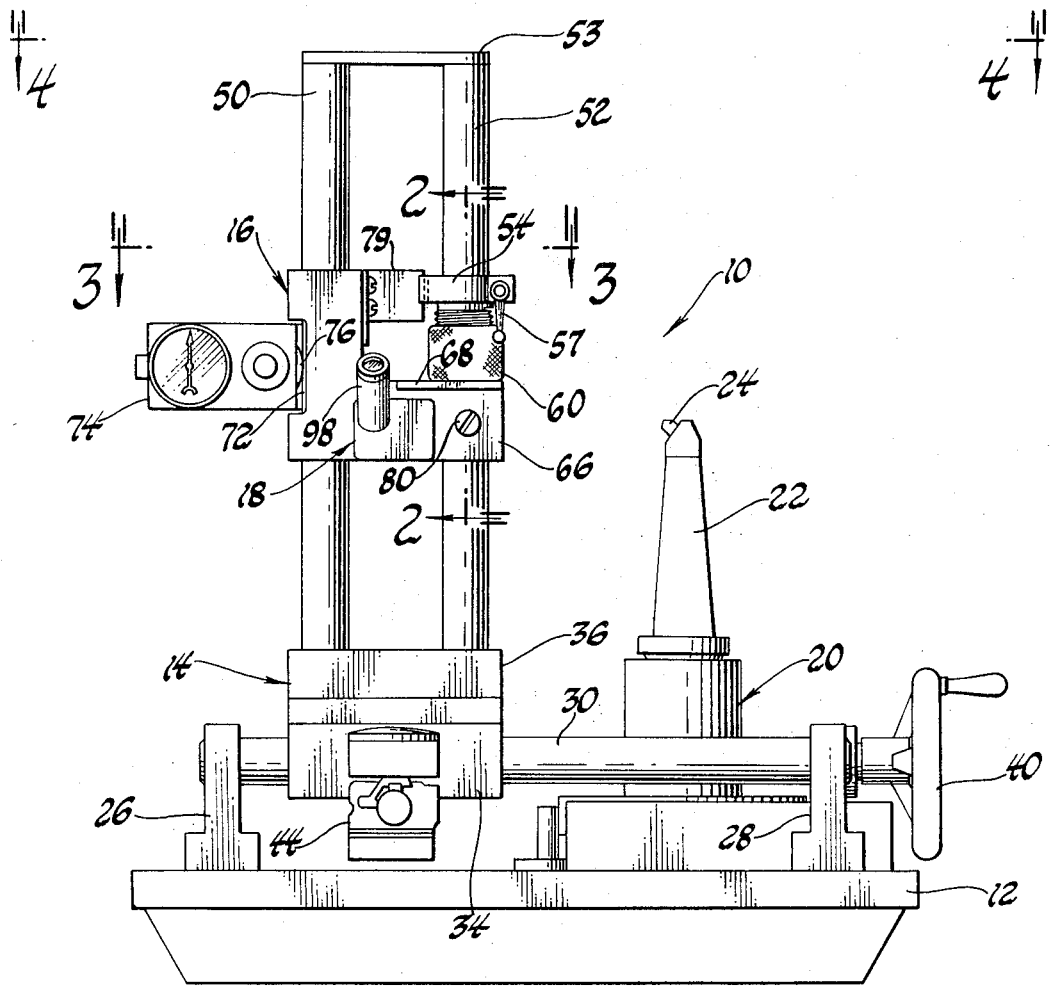

United States Patent
Lewis

[15] 3,701,199
[45] Oct. 31, 1972

[54] BIAXIAL OPTICAL TOOL PRESETTER

[72] Inventor: Hubert G. Lewis, 28128 Independence, Farmington, Mich. 48024

[22] Filed: April 9, 1970

[21] Appl. No.: 26,869

[52] U.S. Cl. .................33/185 R, 33/169 R, 33/201, 33/1 M, 350/81
[51] Int. Cl. .............................................B27g 23/00
[58] Field of Search ........33/185, 201, 181 R, 169 R, 33/1 M; 350/81

[56] References Cited

UNITED STATES PATENTS

| | | | |
|---|---|---|---|
| 3,452,442 | 7/1969 | Lothmann | 33/201 X |
| 3,279,079 | 10/1966 | Schiler | 33/169 R |
| 2,981,123 | 4/1961 | McHugh | 33/1 M X |
| 3,438,133 | 4/1969 | Brault | 33/1 M |
| 3,099,883 | 8/1963 | Bergemann et al. | 33/201 |

FOREIGN PATENTS OR APPLICATIONS 624,364  9/1961  Italy.............................33/161

*Primary Examiner*—William D. Martin, Jr.
*Attorney*—McGlynn, Reising, Milton & Ethington

[57] ABSTRACT

A biaxial optical tool presetting apparatus including a base, a pair of horizontal guide bars which slidingly support a horizontal carriage, a pair of vertical guide bars mounted on the horizontal carriage to slidingly support a vertical carriage, an optical sighting device carried by the vertical carriage, and a tool holder disposed adjacent the biaxial carriage arrangement to receive and hold a presetable tool in a substantially vertical orientation. The vertical carriage arrangement is provided with a fine tuning feature.

16 Claims, 5 Drawing Figures

INVENTOR.
Hubert G. Lewis

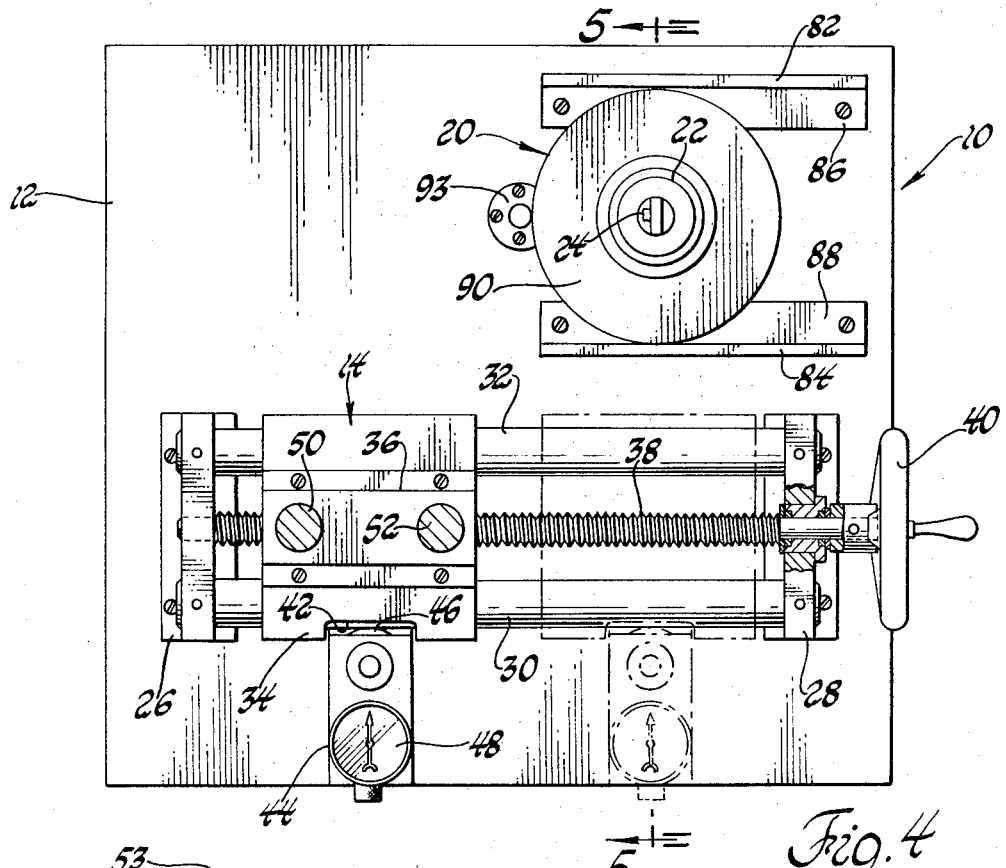
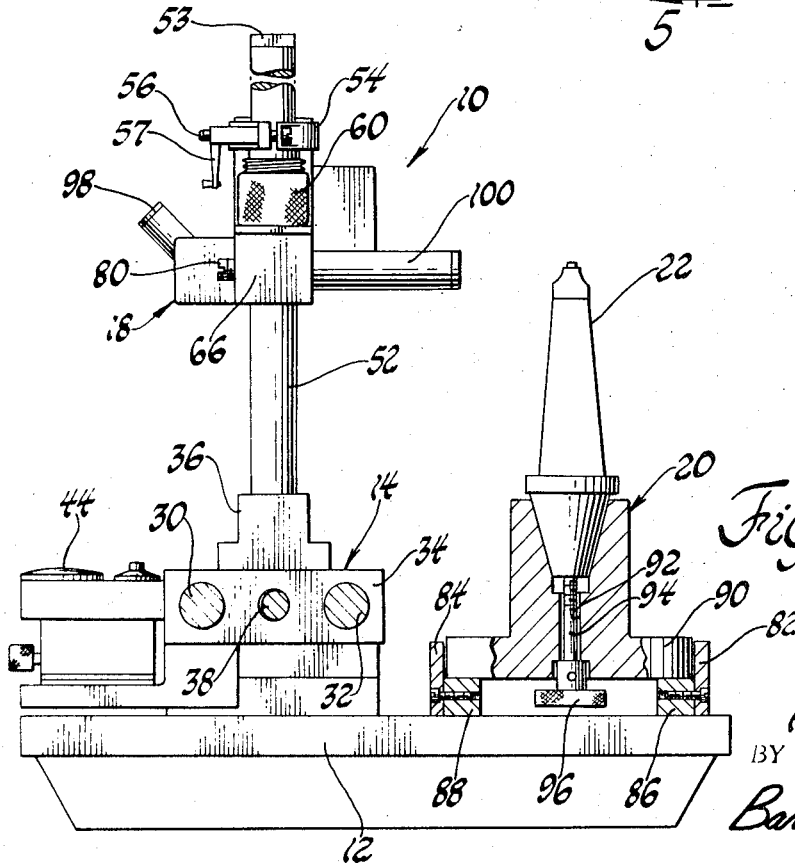

BIAXIAL OPTICAL TOOL PRESETTER

This invention relates to apparatus for presetting tools of the type used in industrial machining operations.

It is well known that machining tools, such as boring bars and milling cutters, must be preset so as to produce the proper cut dimensions when placed in a chuck and brought into contact with a workpiece. Both axial and radial adjustment is necessary to preset the desired depth and diameter of the cut to be made.

Presetting tools is generally accomplished by means of an optical sighting device which is movable relative to the tool along two mutually perpendicular axes. Prior art presetters of the optical type are often expensive arrangements of apparatus disposed on or adjacent the tool holding machine, the cost often lying in the manufacture of accurate ways for carriage displacement. Moreover, such prior art presetters are often difficult to use in that cumbersome measurement devices, such as gauge blocks, are required to determine the distance between a fixed reference and the set point of a tool cutting element.

The present invention provides a tool presetter of the optical type which can be relatively inexpensively manufactured and which is easy to use. In general, this is accomplished through the provision of a tool presetter which is independent of the tool-holding machine and which comprises its own base, a first carriage which is mounted for horizontal axis movement relative to the base, and a second carriage carried by the first for vertical axis displacement relative to the base. The second carriage supports an optical sighting device having an axis which is mutually perpendicular to the horizontal and vertical displacement axes for viewing the cutting tip of a conventional presettable tool. The tool is disposed in a tool holder which is easily received by a base-mounted device adjacent the horizontal carriage. Means are provided in operative engagement with the horizontal and vertical carriages for providing direct readings of horizontal and vertical displacement of the sighting device relative to a fixed reference point such that the optical sighting device may be simply placed in the desired dimensional position relative to centerline and depth of tool and the tool then adjusted until the cutting element lies at the desired position.

In a preferred embodiment, the subject invention comprises a base having a pair of spaced support members between which extend a pair of parallel, spaced guide bars. The guide bars displaceably support the first carriage. The first carriage supports a pair of spaced, parallel vertical guide bars which in turn receive a vertically displaceable carriage which carries the sighting device. The tool holder is adapted to be disposed along side the horizontal guide bars and within the field of view of the optical device to hold the tool in a substantially vertical orientation. Both the horizontal and vertical carriages are provided with measurement devices which make contact with guide bars to register the degree of displacement of the carriages relative to the base along the two perpendicular adjustment axes.

Figure 2:
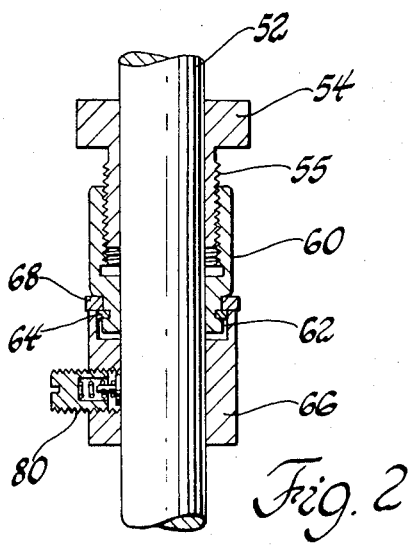
Figure 3:
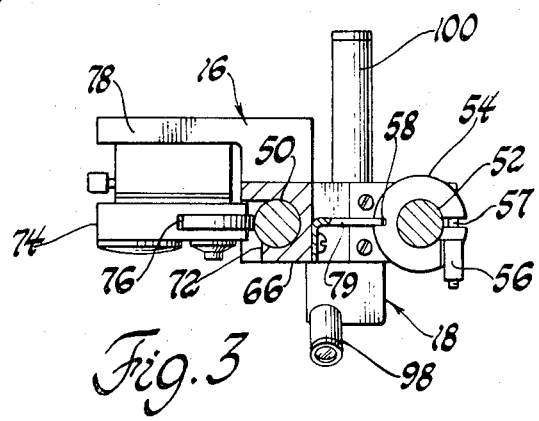

The various features and advantages of the invention will be best understood by a reading of the following specification which describes a specific embodiment of the invention. This specification is to be taken with the accompanying drawings of which:

FIG. 1 is a front view of an optical presetting apparatus embodying the invention, FIG. 2 is a sectional view of a detail in the apparatus of FIG. 1 taken along a section line 2—2, FIG. 3 is a partially sectioned view of another detail of the apparatus of FIG. 1 taken along a line 3—3, FIG. 4 is a plan view of the apparatus of FIG. 1, and, FIG. 5 is a partly sectioned view of the apparatus of FIGS. 1 through 4 looking along a section line 5—5 of FIG. 4.

Referring now to the drawings, the illustrative tool presetter 10 is shown to comprise a rigid base 12, a first carriage 14 which is mounted for horizontal displacement relative to the base 12, a second carriage 16 which is mounted for vertical displacement relative to the first carriage 14, an optical sighting device 18 which is mounted on the vertical carriage 16, and a tool holder 20 which is disposed in a tool station and adapted to receive a conventional boring bar 22 having an adjustable tool insert 24.

The base 12 may be made of ribbed cast iron and provides a flat, support surface for spaced parallel aluminum support members 26 and 28. Disposed between and carried by the support members 26 and 28 are a pair of horizontal, parallel, and spaced guide bars 30 and 32 of circular cross-section.

The support members 26 and 28 are preferably bolted onto the base 12 and the guide bars 30 and 32 are fixedly secured to the support members 26 and 28 to provide a substantially rigid assembly. The horizontal carriage 14 comprises a horizontal slide 34 which is disposed on the guide bars 30 and 32 for horizontal sliding displacement thereover and an inwardly stepped vertical bar support 36 which operates in a manner to be described.

Horizontal slide 34 is a solid, aluminum member having three spaced bores lying in a common horizontal plane, the two outermost bores being adapted to snugly but slideably receive the horizontal guide bars 30 and 32 as best shown in FIG. 5. Although not shown, soft metal bushings may be employed to achieve a close fit. The central bore is adapted to threadly receive a screw shaft 38 which extends between the support members 26 and 28 and is adapted to be rotated therein by means of suitable bearings. Mounted on the end of shaft 38 is a manually operated handle 40. As will be apparent to those of ordinary skill in the art, rotation of the handle 40 and the screw shaft 38 relative to the support members 26 and 28 causes horizontal displacement of the slide 34 over the guide bars 30 and 32, the direction of displacement being selected by the direction of rotation of the handle 40 about the longitudinal axis of screw shaft 38.

Horizontal slide 34 of horizontal carriage 14 is provided with a relieved area 42, as best shown in FIG. 4, so as to receive a first measurement means 44 which registers the horizontal displacement of the carriage 14 relative to the base 12 along the guide bars 30 and 32. First measurement means 44 is preferably a mechanically operated displacement measuring device having an input wheel 46 which engages the front surface of the guide bar 30 and which operates through a gear train (not shown) to produce the registration of horizontal displacement of carriage 14 on a dial face 48. First measurement means 44 preferably measures displacement in one-thousandths of an inch increments. A suitable device may be purchased from Travadial and is provided with an easily reset needle which can be zeroed at any desired position. It is to be understood that non-contacting optical and electrical measurement devices may also be used.

As indicated in the drawings, the vertical bar support 36, which may also be machined out of aluminum stock, is provided with a pair of horizontally spaced bores to receive vertical guide bars 50 and 52 which in turn displaceably support the vertical carriage 16 and the optical sighting means 18. Vertical guide bars 50 and 52 are supported in horizontally spaced, parallel relationship so as to define a vertical axis of displacement of the vertical carriage 16 and are joined at the top by a plate 53. The vertical carriage 16 is divided into separate portions which cooperate with one another as best illustrated in FIGS. 1–3. The first portion comprises a split collar 54 having an exteriorly threaded barrel portion 55 which surrounds the guide bar 52. The enlarged diameter portion has a chordal opening which receives a bolt 57 and a handle 56 to releaseably clamp the collar 54 to the guide bar 52 in any desired vertical position. Collar 54 is also provided with a radially extending notch, 58, best shown in FIG. 3, which serves to coordinate vertical displacement between the first and second vertically adjustable portions of the vertical carriage 16 as will be described hereinafter.

The second portion of the vertical carriage 16 includes as a first element a knurled collar 60 having interior threads which are complementary to and engaged with the threads 55 of the collar 54, as best shown in FIG. 2. Knurled collar 60 has a circumferentially slotted shank portion 62 of reduced diameter, the circumferential slot receiving a lock ring 64 which secures the collar 60 into slide member 66 which is disposed about both the guide bars 50 and 52. The lower shoulder of knurled collar 60 rests on a plate 68 so as to secure that plate to the slide 66. Plate 68 may also be secured to the slide 66 by means of screws, as best shown in FIG. 3. Slide 66 carries the optical sighting device 18.

Slide 66, which may be fabricated as several pieces, is provided with a relieved area 72 which receives a second measurement means 74 identical to means 44 and having a drive wheel 76 which contacts the guide bar 50 to register displacement of the slide 66 and the optical sighting device 18 relative to the guide bar 50 in increments of one-thousandths of an inch. Measurement means 74 is again preferably a mechanical displacement tracking and registering device such as a Travadial. Second measurement means 74 may be supported on the slide 66 by means of an instrument support bracket 78 shown in FIG. 3.

Secured to the upper portion of slide 66 and extending radially inwardly, that is, toward the second guide bar 52, is a blade member 79 which extends into the notch 58 in the collar 54. Accordingly, vertical adjustment of the carriage 16 is accomplished by rotating the handle 56 to loosen the split collar 54 and manually adjusting the vertical carriage 16 to the approximate desired position. At this point handle 56 is rotated to tighten the split collar 54 thereby to clamp the vertical carriage into the approximately desired position on the vertical guide bars 50 and 52. At this point the knurled collar 60 may be rotated manually to cause relative vertical travel between the complementally threaded member 54 and 60. Since collar 54 is secured to the guide bar 52, the relative vertical adjustment between collars 54 and 60 causes the slide 66 to move vertically relative to the guide bars 50 and 52, thus, to provide a fine or Vernier adjustment in the vertical position of the optical sighting device 18 and the second measurement means 74. The blade member 79 simply moves vertically in the notch 58 of the split collar 54 to maintain the proper alignment between the relatively vertically movable portions of the vertical carriage 16.

The proper radial bias between the elements of the vertical carriage 16 and the guide bars 50 and 52 may be accomplished by the use of bushings (not shown) in the slide 66 and about the guide bar 50 and the use of spring-loaded, screw-type inserts 80 in the slide 66 to bear against the guide bar 52. Such inserts are well known and will not be discussed in detail.

Looking now to the tool holder 20, FIGS. 4 and 5 illustrate this assembly as being disposed in a tool station comprising a pair of straight steel guide rails 82 and 84 which are disposed on the base 12 in spaced parallel relationship, the longitudinal axis of each of the rails 82 and 84 being parallel to the horizontal displacement axis of the carriage 14. The rails 82 and 84 are secured such as by bolts to spacer bars 86 and 88 having relatively square cross-sections and in turn being fastened such as by bolts to the base 12. This assembly provides an internally stepped channel which receives the end flange 90 of the tool holder 20 in vertically spaced relation to the upper horizontal support surface of the base 12, as best shown in FIG. 5. The tool station further includes a stop member 92 which is disposed between the rails 82 and 84 adjacent the inward end thereof as shown in FIG. 4 to interferingly abut the peripheral surface of the flange 90 of the tool holder 20. This permits the tool holder 20 to be slidingly inserted between the rails 82 and 84 so as to rest on the spacer bars 86 and 88 and moved horizontally adjacent the horizontal carriage 14 until it reaches a rest position defined by the stop 92. At this time the tool holder 20 lies in a substantially vertical orientation the cutting element 24 of the tool 22 being directly within the field of vision of the biaxially displaceably optical sighting device 18.

The tool holder 20 is provided with a longitudinally extending interior bore 92 which receives a threaded shaft 94. Mounted on the lower end of the shaft 94 is a knurled turning handle 96 which permits the threaded shaft 92 to be inserted into threaded engagement with the tool 22 in a manner which will be apparent to those skilled in the art. The spacer bars 86 and 88 provide enough vertical clearance for the knurled turning handle 96, as shown in FIG. 5.

Looking now to the optical sighting device 18 it can be seen that this device includes an eye piece 98 and a sighting tube 100 which is oriented in a horizontal plane such that the viewing path lies along an axis which is perpendicular to the horizontal axis of displacement of carriage 14 and also perpendicular to the vertical axis of displacement of carriage 16. This is also perpendicular to the tool station ways defined by guide rails 82 and 84. The viewing tube 100, as shown in FIG. 5, is aimed substantially directly at the cutting tip of the tool 22 so as to permit a fine, biaxial adjustment in the coordinate position of the optical output tube 100 relative to the base 12. The sighting device 18 is provided with a cross hair or reticle to permit exact superimposition on the surfaces of the cutting tip 24 as will be apparent to those of ordinary skill in the art.

In the operation of the assembly 10, the tool 22 is suitably inserted in the tool holder 20 by means of the threaded shaft 94 and the knurled turning handle 96. The tool holder 20 is then placed between the upright rails 82 and 84 and moved horizontally parallel to guide bars 30 and 32 in abutting engagement with the stop 92. Tool 20 may be rotated slightly as necessary to bring it into focus within the field of view of the optical sighting means 18. The cutting tip 24 is then adjusted along its own axis relative to the cutter bar 22 until the tip 24 lies within the coordinates established by the optical viewing device 18. Such adjustment, of course, affects both radial and axial locations of tip 24 relative to the axis of cutter bar 22. These coordinates are preset or preestablished by taking readings from a specification which readings establish the horizontal and vertical readings which are to be obtained on the first and second measurement devices 44 and 74, respectively. The centerline of tool holder 20 and a gauge line on tool 22 establish the horizontal and vertical reference points, respectively.

Discussing the operation in somewhat greater detail, the horizontal specification, that is, the radius of the cut to be made using the tool 22, establishes the reading which is to be taken from the horizontal measuring device 44 relative o a preestablished reference position which corresponds to the centerline of the tool 22 when properly placed within the tool holder apparatus 20 and with the tool holder 20 properly spaced between the rails 82 and 84 and abutting the stop 92. The horizontal carriage 14 is placed in the proper position by rotating the handle 40 and the screw shaft 38 to cause horizontal displacement of the carriage 14. Once the proper horizontal position is obtained, the vertical carriage 16 is adjusted to the proper elevation in a manner previously described. This manner involves the loosening and tightening of handle 56 to unclamp and clamp the split collar 54 about the guide bar 52, as already explained. Once an approximately vertical orientation of carriage 16 has been obtained, a fine adjustment is obtained by rotating the knurled collar 60 about the clamp collar 54 to effect displacement of the slide 66 relative to the clamped collar 54. Movements of slide 66, of course, causes vertical movement of optical device 18, thus, to obtain the fine tuning effect. Of course, since both rough and fine movement of the slide 66 relative to the bar 50 is monitored by means of the second measuring device 74 no loss of accuracy is caused.

It is to be understood that both the tool holder 20 and the cutter bar 22 of the illustrated embodiment may be variously selected among the various devices now and later commercially available. For example, holder 20 may be replaced with a device which holds a plurality of presetable tools of various sizes and/or types. Also a rotatable turret tool-holder arrangement is often used in numerically controlled turning applications. In the event the subject device is to be used to preset tools of the type illustrated as well as such a turntable or turret-type tools it is desirable to provide a third axis adjustment between the tool station elements and the base 12 so as to permit the tool holder 20 or a modification thereof to be adjusted relative to base 12 in the focal plane of device 18; i.e., along the axis which is mutually perpendicular to the displacement axes of carriages 14 and 16. Alternatively, means may be provided for effecting such horizontal displacement of the optical sighting device 18 for focusing purposes.

The foregoing description is to be understood to be illustrative in nature and is not to be construed in a limiting sense.

The embodiments of the invention in which an exclusive property or privilege is claimed are defined as follows:

1. A tool presetter comprising: a base, a first carriage mounted on the base for horizontal axis displacement relative thereto, a second carriage mounted on the first carriage for vertical axis displacement relative thereto, first and second measuring means associated with the first and second carriages, respectively, for measuring the extent of the horizontal axis and vertical axis displacements, optical sighting means mounted on the vertical carriage for displacement therewith and having an optical axis which is mutually perpendicular to the horizontal and vertical displacement axes, and a tool holder station on the base for receiving and maintaining a presettable tool in a substantially vertical orientation adjacent the optical sighting means and within the field of view thereof, said tool holder station being disposed such that a tool placed therein is transversely spaced from the axis of horizontal displacement of the first carriage.

2. A tool presetter as defined in claim 1 comprising; first and second horizontally spaced support members disposed on the base, and a pair of first guide bars disposed between and supported by the support members in spaced, parallel relation along the horizontal displacement axis, the first carriage being carried by the first guide bars for sliding displacement relative thereto.

3. A tool presetter as defined in claim 2 including means for effecting controlled displacement of the first carriage relative to the first guide bars.

4. A tool presetter as defined in claim 3 wherein the first measurement means is carried by the first carriage in contact with at least one of the first guide bars to register the horizontal displacement of the first carriage relative thereto.

5. A tool presetter as defined in claim 1 comprising: a pair of second guide bars supported by the first carriage in spaced parallel relation along the vertical displacement axis, the second carriage being displaceably carried by the second guide bars.

6. A tool presetter as defined in claim 5 including means on the second carriage for releaseably clamping the carriage to one of the second guide bars in any given vertical position.

7. A tool presetter as defined in claim 6 including means on the second carriage for effecting controlled displacement of the optical sighting means relative to the guide bars when the second carriage is in the clamped condition.

8. A tool presetter as defined in claim 6 wherein the second measurement means is carried by the second carriage in contact with one of the second guide bars to register vertical displacement of the optical sighting means relative thereto.

9. A tool presetter as defined in claim 5 wherein the second carriage comprises a first portion slidably disposed on one of the second guide bars and a second portion slidably disposed on the other of the second guide bars, means for releaseably clamping the first portion of said one guide bar in any selected vertical position, and adjuster means operatively interconnecting the first and second portions to permit the second portion to be vertically adjusted relative to the clamp first portion, the optical sighting means being carried by the second portion.

10. A tool presetter as defined in claim 9 including a collar carried by the first portion and having a radial notch therein, and a blade member carried by the second portion and extending into the notch to slide vertically therein during adjustment of the first and second portions.

11. A tool presetter as defined in claim 9 wherein said adjuster means includes first and second complementally threaded member disposed about the said one guide bar and mechanically connected to the first and second portions, respectively.

12. A tool presetter as defined in claim 5 wherein the second guide bars are of circular cross-section, and means carried by the second carriage for maintaining a radial bias between the second carriage and at least one of the second bars.

13. A tool presetter as defined in claim 1 wherein the tool station includes a pair of rails on the base in parallel spaced relation to receive the tool holder for sliding relationship therewith along an axis parallel to the horizontal displacement axis.

14. A tool presetter as defined in claim 13 including a tool holder of generally cylindrical configuration and having a base flange of increased diameter, the spacing between the rails being such as to accommodate the base flange therebetween, and stop means on the base to abut the base flange when in the desired operating position.

15. A tool presetter as defined in claim 14 wherein the tool holder includes an axial socket for receiving a tool therein, a securement shaft extending axially through the tool holder into the socket, and a turning knob on the shaft and extending through the base flange of the tool holder.

16. The tool presetter defined in claim 15 including a pair of spacer bars disposed inwardly adjacent the rails to space the tool holder vertically from the base.

* * * * *